US005906678A

United States Patent [19]

Fujiyama et al.

[11] Patent Number: 5,906,678

[45] Date of Patent: May 25, 1999

[54] HOT MELT COLORED INK

[75] Inventors: Jitsunori Fujiyama, Minamisaitama-Gun; Masakazu Kimura, Kawaguchi; Nobuhiko Naito, Yokohama; Yoshio Takamura, Inba-Gun, all of Japan

[73] Assignees: Polycol Color Industries Co., Ltd.; Chori Co., Ltd.; Dai Nippon Printing Co., Ltd., all of, Japan

[21] Appl. No.: 08/952,469

[22] PCT Filed: May 15, 1996

[86] PCT No.: PCT/JP96/01281

§ 371 Date: Nov. 17, 1997

§ 102(e) Date: Nov. 17, 1997

[87] PCT Pub. No.: WO96/36673

PCT Pub. Date: Nov. 21, 1996

[30] Foreign Application Priority Data

May 19, 1995 [JP] Japan .................................... 7-144242

[51] Int. Cl.$^6$ ............................ C09D 11/02; C09D 11/12

[52] U.S. Cl. ..................................... 106/31.29; 106/31.61

[58] Field of Search .............................. 106/31.29, 31.61

[56] References Cited

U.S. PATENT DOCUMENTS

| | | | |
|---|---|---|---|
| 4,828,922 | 5/1989 | Koshizuka et al. | 428/412 |
| 5,259,873 | 11/1993 | Fujioka | 106/31.62 |
| 5,427,611 | 6/1995 | Shirota et al. | 106/31.29 |
| 5,531,819 | 7/1996 | Sawada | 106/31.3 |

FOREIGN PATENT DOCUMENTS

| | | |
|---|---|---|
| 58-129074 | 8/1983 | Japan . |
| 61-268776 | 11/1986 | Japan . |
| 63-248878 | 10/1988 | Japan . |
| 3-192170 | 8/1991 | Japan . |

*Primary Examiner*—Helene Klemanski
*Attorney, Agent, or Firm*—Parkhurst & Wendel, L.L.P.

[57] ABSTRACT

A hot melt colored ink comprising: a coloring component being at least one selected from the group consisting of carbon black, an inorganic pigment, an organic pigment, a dye and an inorganic extender pigment; phytosterol and/or a derivative thereof in an amount of 0.1 to 90% by weight of the hot melt colored ink; and optionally a thermoplastic resin in an amount of 1 to 80% by weight of the hot melt colored ink. According to the hot melt colored ink of the present invention, various disadvantages found in conventional hot melt colored ink, such as grime, patchy, unsharpness and stain of transferred print (transferred image) does not occur and a print evenness and a performance (a quality and resolving power of transferred recording image) of transferred print on a transferable recording material (transferable recording paper etc.) are sufficient.

5 Claims, No Drawings

HOT MELT COLORED INK

FIELD OF THE INVENTION

The present invention relates to a hot melt colored ink, and more particularly, to a hot melt colored ink containing phytosterol and/or a derivative of phytosterol suitable for use in a heat transfer layer of a heat transfer recording material.

BACKGROUND ART

In a heat transfer system using a thermal printing head, a substrate comprising a paper or a heat-resistant plastic film, such as a polyester film, having a thickness of about 10 $\mu$m and coated with a hot melt colored ink containing a coloring agent, such as a pigment, is heated with a thermal printing head from the side of the substrate to soften and melt the ink, whereby the hot melt ink is transferred to the surface of a receiving material such as a receptive paper.

The conventional hot melt colored ink used in a heat transfer layer of a heat transfer recording material generally contains an ink binder comprising a wax having a melting point of 50° C. to 90° C., a dispersant and a thermoplastic resin such as an ethylene-vinyl acetate copolymer (EVA resin) and a coloring component such as a pigment and a dye. In the conventional hot melt colored ink, EVA resin is an essential component as the ink binder. Consequently, irritating odor generated during the process of mixing and kneading components under heating to produce the hot melt colored ink causes deterioration in work place. Further, EVA resin tends to increase cost for producing a hot melt colored ink.

As a binder for a hot melt colored ink, waxes have been employed. Such waxes include natural waxes such as carnauba wax, candelilla wax, bees wax and montan wax, mineral oil type waxes such as paraffin wax and microcrystalline wax, and synthetic waxes such as polyethylene wax and oxidation wax. Since all of these waxes have poor compatibility with other components, low molecular weight and low melt viscosity, the conventional ink binder has insufficient solubility and dispersibility for a coloring pigment. Furthermore, a hot melt colored ink containing a wax as an ink binder has disadvantages such as grimes, poor sharpness, blurs and stains because of low hardness (needle penetration) and low melt viscosity of the ink. The hot melt colored ink containing a wax has also disadvantages such that the peel strength, unevenness and performance (quality and resolution of the transfer recorded image) of the image printed on a recording material (a receptive paper) are insufficient.

SUMMARY OF THE INVENTION

An object of the present invention is to provide a novel hot melt colored ink that eliminates the abovementioned disadvantages.

The primary object of the present invention is to improve the dispersibility of a coloring component such as carbon black and a pigment in a hot melt colored ink by adding phytosterol and/or a derivative thereof to the hot melt colored ink, and obtain a novel hot melt colored ink with superior affinity and adhesiveness to a recording material such as a paper as compared to a conventional hot melt colored ink containing linear waxes.

Second, according to the present invention, a novel hot melt colored ink is provided, which is excellent in strength of transferred image or print transferred on a surface of a recording material (receptive paper), by employing a polyethylene resin which is not expensive but has not been considered to be usable as a binder so far.

Thirdly, according to the present invention, a polyethylene resin can be employed, in place of EVA resin, whereby irritating odor to be generated during the process of mixing and kneading components under heating to produce hot melt colored ink can completely be prevented to improve environmental conditions in work place.

Fourth, according to the present invention, a hot melt colored ink having good durability against oxidation deterioration and light deterioration, excellent adhesiveness to a recording material (receptive paper and the like) can be provided. According to the present invention, various disadvantages found in the conventional ink, such as grimes, patchiness, unsharpness (blurs) and stains of the transferred print (transferred image) can effectively be avoided and print evenness and performance (quality and resolution of the transfer recorded image) are surprisingly improved.

As the result of intensive research conducted by the inventors to solve the problems which the conventional hot melt colored ink had, it has been found that a substance comprising phytosterol as a main component, which is used in the medical field as a controlling agent for cholesterol has excellent compatibility (miscibility) with a thermoplastic resin such as polystyrene. It has further been found that, when the substance was used as a material for the binder of the hot melt colored ink in a thermal transfer recording material, a coloring pigment can very well be dispersed in the ink composition.

It has also good compatibility with other components such as a thermoplastic resin, wax and additives mixed into the ink.

DISCLOSURE OF THE INVENTION

The present invention encompasses the following hot melt colored ink.

A hot melt colored ink comprising: at least one coloring component selected from the group consisting of carbon black, an inorganic pigment, an organic pigment, a dye and an inorganic extender pigment; phytosterol and/or a derivative thereof in an amount of 0.1 to 90% by weight of the hot melt colored ink; and a thermoplastic resin in an amount of 1 to 80% by weight of the hot melt colored ink.

A hot melt colored ink comprising: at least one coloring component selected from the group consisting of carbon black, an inorganic pigment, an organic pigment, a dye and an inorganic extender pigment; phytosterol and/or a derivative thereof in an amount of 0.1 to 90% by weight of the hot melt colored ink; and a thermoplastic resin in an amount of 1 to 80% by weight of the hot melt colored ink.

The hot melt colored ink according to the above, wherein the thermoplastic resin comprises a polyethylene resin.

The hot melt colored ink according to the above, further comprising at least one wax selected from the group consisting of a natural wax, a mineral wax and a synthetic wax.

The hot melt colored ink of the present invention includes a concentrate of an ink. The concentrate includes an ink composition comprising a thermally meltable colored ink having a concentration of a coloring component of 3–20% by weight and those having a concentration of a coloring component of 20–80% by weight, preferably 40–60% by weight, based on the concentrate. The concentrate means the ink having a higher concentration than that in use by adding an ink binder component (carrier) such as natural and synthetic waxes and thermoplastic resins.

DETAILED DESCRIPTION OF THE INVENTION

The heat transfer recording material used in the present invention includes a thermal transfer recording material having a hot melt colored ink layer as a transfer layer, a gradient meltable thermal transfer recording material in which the amount of a transferring ink can be changed depending on the degree of thermal energy, a thermal transfer recording material for a sublimation thermal transfer system in which a colored ink layer comprising a thermally sublimable dye or a thermally vaporizable dye is used as a transfer layer and a thermal transfer recording material having a transfer layer comprising a leuco dye. The heat transfer recording material having a hot melt colored ink layer is preferably used. However, materials used in the present invention are not particularly limited to the above-exemplified ones.

In any recording material, a substrate coated with a hot melt colored ink generally comprises heat resistant films or sheets having a thickness of several μm to 10-odd μm.

The substrate coated with a hot melt colored ink includes a paper such as a condenser paper and a thin paper and a sheet or film of a heat resistant synthetic resin such as a polyester, polyimide and polycarbonate.

A recording material (acceptor sheet) on which a transferred image or print is recorded used in the present invention includes commercially available common papers, high quality papers (papers for PPC), coat papers, OHP films, synthetic papers, plastic sheets and the like.

The hot melt colored ink used in the present invention must comprise one or more coloring agents selected from the group consisting of carbon black, an inorganic or organic pigment, a dye and an inorganic extender pigment. The coloring component includes a pigment, a dye and a sublimable dye such as carbon black, iron oxide black, phthalocyanine blue, phthalocyanine green, azo type pigment, quinophthalone pigment, anthraquinone pigment, perylene pigment, quinacridone pigment, dye and the like which are used generally in the field of printing inks, paints and plastics.

In the present invention, the hot melt colored ink comprising one or more coloring agents selected from the group consisting of carbon black, an inorganic or organic pigment, a dye and an inorganic extender pigment, must contain 0.1 to 90% by weight of phytosterol and/or a derivative thereof.

The "phytosterol" in the present invention is a generic term for cyclic alcohols such as stigmasterol, campesterol, brassicasterol, β-sitosterol and the like as shown in the following chemical structures (1)–(4), wherein R represents a methyl group.

(1)

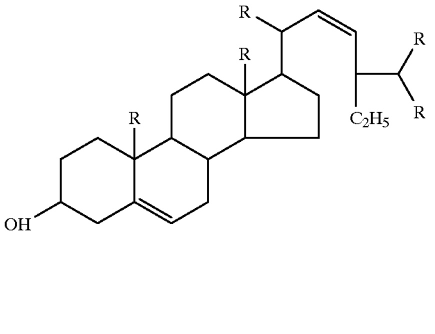

-continued (2)

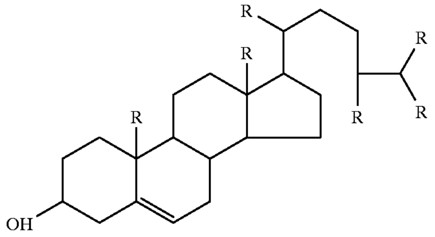

(3)

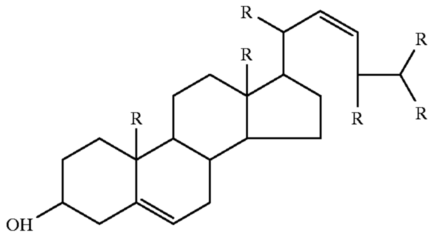

(4)

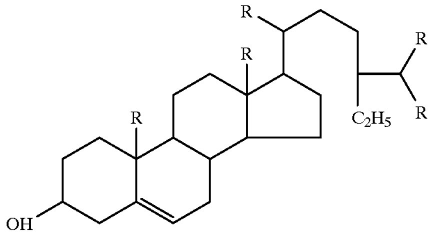

These cyclic alcohols have cyclic skeletons (cyclic ring) similarly as in the chemical structure of cellulose and therefore (these alcohols) have good affinity and adhesiveness to a cellulosic recording material such as a paper, thereby giving an ink binder having good affinity and adhesiveness to a recording material as compared with the conventional ink binder using linear waxes.

The derivative of phytosterol in the present invention means a derivative in which a hydroxyl group in the cyclic alcohol is substituted. The derivative includes an ester of the phytosterol with an organic acid such as a higher fatty acid, an ester thereof with an inorganic acid such as sulfonic acid, a metal addition compound of the cyclic alcohol with Na, K, Ca, Cu, Mg, Zn or Al, alkoxylated phytosterol with methyl and ethyl and hydrogenated phytosterol. The derivative can be obtained from phytosterol by a conventional organic chemical process.

The phytosterol is present in ester form in certain species of plants in relatively small quantities, and can be obtained in co-existent form with the ester by extracting from the plants and refining the extract.

The phytosterol such as stigmasterol, campesterol, brassicasterol, and β-sitosterol is present in relatively small quantities especially in farm products such as soybeans, rapeseeds, tall oil, azuki beans and sugar cane and marine products such as tangle. For example, in the case of soybeans, the content of the cyclic alcohol is about 0.08% by weight and three kinds of cyclic alcohols, i.e., β-sitosterol, stigmasterol and campesterol are mainly contained. In the case of rapeseeds, the content of the cyclic alcohol is about 0.04% by weight and four kinds of cyclic alcohols, i.e., β-sitosterol, stigmasterol, campesterol and brassicasterol are mainly contained.

The phytosterol ester used in the present invention can be prepared by reacting a cyclic alcohol (phytosterol) and/or an ester thereof (phytosterol ester) obtained from the plants by extracting and refining directly with an organic acid such as higher fatty acid and an inorganic acid such as sulfonic acid.

The metal addition compound of phytosterol used in the present invention can be prepared by reacting the thus obtained phytosterol and/or an ester thereof with a metal such as Na, K, Ca, Cu, Mg, Zn or Al.

The alkoxylated phytosterol used in the present invention can be prepared by a conventional process to introduce a methyl group, an ethyl group and the like. The hydrogenated phytosterol used in the present invention can be prepared by adding hydrogen to phytosterol and/or an ester thereof.

The hot melt colored ink of the present invention should contain 0.1 to 90% by weight, preferably 0.2 to 80% by weight, most preferably 0.5 to 50% by weight based on the total amount of the hot melt colored ink composition of phytosterol and/or a derivative thereof. When the ink content is less than 0.1% by weight, advantageous effects of the present invention are hardly expected.

The phytosterol and/or a derivative thereof contained in the hot melt colored ink has excellent compatibility with thermoplastic resins such as polyethylene resins or copolymers thereof (EEA, EAA etc.), polypropylene resins, polystyrene resins, AS resins, acrylic resins (AN), PMMA resins, vinyl acetate resins or copolymers thereof (EVA etc.) and polyester resins, and waxes such as natural waxes, synthetic waxes and mineral waxes. From the viewpoint of the performance of the phytosterol and/or a derivative thereof, polyethylene resins became applicable as ink binders. Polyethylene resins were not considered to be applicable as ink binders before the present invention.

By using polyethylene as the ink binder, the dispersibility of a coloring pigment is remarkably improved and disadvantages of the transferred image (transfer print), for example, grimes, poor sharpness, blurs and stains are eliminated. The present invention can also provide a heat transfer recording material having improved printing efficiency, durability and storage stability.

Namely, since the phytosterol and/or a derivative thereof is employed as the ink binder of the hot melt colored ink in the present invention, a polyethylene resin becomes applicable together with other components of the hot melt colored ink. According to the present invention, the dispersibility of a pigment, especially, that of carbonblack, as well as the durability of the hot melt colored ink against oxidation deterioration and light deterioration are remarkably improved. Further, the hot melt colored ink having such excellent performance that the transferred print (transferred image) on the recording material (receptive paper) has a sharp image can be provided.

The polyethylene resin used in the present invention includes low density polyethylene, medium density polyethylene and high density polyethylene. The low density polyethylene, such as linear low density polyethylene (L-LDPE), low density polyethylene (LDPE) or ultra low density polyethylene (V-LDPE, U-LDPE), is preferred. The polyethylene resin is blended into the hot melt colored ink in a proportion of 1 to 80% by weight, preferably 2 to 70% by weight, most preferably 3 to 50% by weight based on the total amount of the hot melt colored ink composition. As shown in Examples, the present invention has a feature that the polyethylene resin can be blended into the hot melt colored ink in a large amount.

An ink binder (carrier) can also be blended into the hot melt colored ink of the present invention. The ink binder used in the present invention includes conventional waxes, for example, natural waxes such as carnauba wax, candelilla wax, bees wax, rice wax and sugar cane wax, mineral oil type waxes such as montan wax, paraffin wax and microcrystalline wax, polyolefin waxes such as polyethylene wax and polypropylene wax, synthetic waxes such as polystyrene wax and oxidized wax.

The hot melt colored ink as the composition of the present invention may be prepared, for example, by premixing all the components, that is, a carbon black as a colorant component, a phytosterol (a compatibility improver), a low-density polyethylene as a thermoplastic resin component, a paraffin wax as an ink binder (a wax component), and other additives, and kneading and dispersing the premix by means of a three-roll mill to prepare a hot melt colored ink. Alternatively, three components, that is, a carbon black as a colorant component, a phytosterol as a compatibility improver, and a low-density polyethylene as a thermoplastic resin component, may be mixed together followed by kneading by means of a Banbury mixer, a twin-screw extruder, HIDM or the like to prepare a hot melt colored ink concentrate having a high carbon black concentration of 30 to 70% by weight. This hot melt colored ink concentrate may be further mixed and diluted with an ink binder (a wax component) and other additives by means of a dispersion mixer, such as a three-roll mill, to a final carbon black concentration, thereby preparing a hot melt colored ink. A further method for preparing the hot melt colored ink is to mix a master batch of a carbon black commonly used for a plastic in the art (colorant component concentration: 20 to 60% by weight) with a phytosterol (a compatibility improver), a paraffin wax as an ink binder (a wax component), and other additives followed by kneading and dispersion by means of a three-roll mill or the like.

The following examples and comparative examples further illustrate the present invention but are not intended to limit it.

At the outset, a cyclic alcohol (a phytosterol), a modified cyclic alcohol (a phytosterol stearate), carnauba wax, and montan wax were provided as samples. In order to evaluate the compatibility of these samples with a resin, the samples were kneaded with a resin. The procedure and results of the evaluation will be described in the following Experiment Examples 1 and 2 and Comparative Experiment Examples 1 and 2.

EXPERIMENT EXAMPLE 1

0.1 to 90% by weight of a cyclic alcohol (a phytosterol) was added to and premixed with a straight-chain polyethylene having a density of 0.926 g/cm and a melt flow rate (MFR) of 50/10 min (tradename: NUC G-5391, manufactured by Nippon Unicar Co., Ltd.), and the premix was mixed and kneaded by means of a heated three-roll mill to evaluate the compatibility of the cyclic alcohol with the polyethylene.

In evaluating the compatibility, the premix was mixed and kneaded (5 passes) by means of a three-roll mill heated at a temperature of 110° C. In this case, observation was made on whether or not the two components were compatible and could be well mixed with each other; and whether the kneaded product was in the form of an intimate mixture of the two components, or was not in the form of an intimate mixture of the two components (that is, the two components were not satisfactorily compatible with each other) and caused phase separation into the two components.

Further, the mixture was formed into a 1 mm-thick sheet. The opaqueness of this sheet was measured in terms of a lowering in light transmittance and compared with that of a reference sheet of polyethylene (NUC G-5391) to evaluate the compatibility.

(Results of evaluation of compatibility with resin)

When the cyclic alcohol (phytosterol) was used in an amount of 0.1 to 90% by weight, it was highly compatible and could be intimately mixed and kneaded with the resin without separation of the two components. In this connection, unfavorable phenomena such as found in the case of poor compatibility, including separation of two components due to heterogeneous mixing and bleeding (spew) onto the surface of the mixture, were not observed at all. Further, when the cyclic alcohol (phytosterol) was used in an amount of 0.1 to 90% by weight, the sheet caused no significant lowering in transparency as evaluated based on the transparency of the reference polyethylene sheet, indicating that the cyclic alcohol had excellent compatibility with the resin.

EXPERIMENT EXAMPLE 2

In the same manner as in Experiment Example 1, 0.1 to 90% by weight of a modified cyclic alcohol (phytosterol stearate) was added to and premixed with a straight-chain polyethylene having a density of 0.926 g/cm and a melt flow rate (MFR) of 50/10 min (tradename: NUC G-5391, manufactured by Nippon Unicar Co., Ltd.), and the premix was mixed and kneaded by means of a heated three-roll mill to evaluate the compatibility of the modified cyclic alcohol with the polyethylene.

The modified cyclic alcohol used in this Experiment Example 2 was prepared as follows. A phytosterol (purity about 80%) which had been extracted for medicinal use was provided, and 20% by weight of a commercially available, industrial stearic acid was added to 80% by weight of this phytosterol, followed by a reaction while passing a hydrogen gas into the system for 4 hr to synthesize phytosterol stearate as a modified cyclic alcohol.

The compatibility was evaluated in the same manner as in Experiment Example 1.

Further, the mixture was formed into a 1 mm-thick sheet. The opaqueness of this sheet was measured in terms of a lowering in light transmittance and compared with that of a reference sheet of polyethylene (NUC G-5391) to evaluate the compatibility.

(Results of evaluation of compatibility with resin)

When the modified cyclic alcohol (phytosterol stearate) was used in an amount of 0.1 to 90% by weight which was the same as the amount of the cyclic alcohol in Experiment Example 1, it was highly compatible and could be intimately mixed and kneaded with the resin without separation of the two components. In this connection, unfavorable phenomena, including separation of two components and bleeding onto the surface of the mixture, were not observed at all.

Further, as with the sheet in Experiment Example 1, the sheet of the kneaded mixture of Experiment Example 2 caused no significant lowering in transparency as evaluated based on the transparency of the reference polyethylene resin sheet when the modified cyclic alcohol was used in an amount of 0.1 to 90% by weight.

COMPARATIVE EXPERIMENT EXAMPLE 1

The procedure of Experiment Example 1 was repeated, except that a carnauba wax commonly used in the art was used instead of the cyclic alcohol. Specifically, 0.1 to 90% by weight of the carnauba wax (native to Brazil, manufactured by Melilla) was added to and premixed with a straight-chain polyethylene having a density of 0.926 g/cm and a melt flow rate (MFR) of 50/10 min (tradename: NUC G-5391, manufactured by Nippon Unicar Co., Ltd.), and the premix was mixed and kneaded by means of a heated three-roll mill to evaluate the compatibility of the carnauba wax with the polyethylene.

(Results of evaluation of compatibility with resin)

The carnauba wax which, when the amount added exceeded 3% by weight, caused a slip phenomenon at the time of kneading by means of a heated three-roll mill and did not have satisfactory compatibility with the polyethylene resin to cause the two components to be separated into each other and the carnauba wax to bleed on the surface of the mixture, demonstrating that the carnauba wax had poor compatibility with the polyethylene resin.

COMPARATIVE EXPERIMENT EXAMPLE 2

The procedure of Experiment Example 1 was repeated, except that a montan wax commonly used in the art was used instead of the cyclic alcohol. Specifically, 0.1 to 90% by weight of a montan wax (tradename: Hoechst Wax-U, manufactured by Hoechst) was added to and premixed with a straight-chain polyethylene having a density of 0.926 g/cm and a melt flow rate (MFR) of 50/10 min (tradename: NUC G-5391, manufactured by Nippon Unicar Co., Ltd.), and the premix was mixed and kneaded by means of a heated three-roll mill to evaluate the compatibility of the carnauba wax with the polyethylene.

(Results of evaluation of compatibility with resin)

The montan wax (Hoechst Wax-U) which, when the amount added exceeded 4% by weight, caused a slip phenomenon at the time of kneading by means of a heated three-roll mill and, as with the carnauba wax, did not have satisfactory compatibility with the polyethylene resin, whereby the two components were separated into each other and the montan wax bled on the surface of the mixture, demonstrating that the montan wax had poor compatibility with the polyethylene resin.

EXAMPLE 1

5 parts by weight of a carbon black (tradename: M-130, manufactured by Cabot Corporation) as a coloring pigment, 5 parts by weight (5% by weight) of a cyclic alcohol (a phytosterol), 45 parts by weight of a polyethylene resin (tradename: NUC G-5391, manufactured by Nippon Unicar Co., Ltd.), and 45 parts by weight of a paraffin wax (microcrystalline wax, tradename: Hi-Mic-2065, manufactured by Nippon Seiro Co., Ltd.) were premixed together, and the premix was mixed and kneaded (4 passes) by means of a three-roll mill type dispersion mixer to disperse the carbon black, thereby preparing a hot melt colored ink.

This hot melt colored ink was sandwiched between two slide glasses, and the sandwich was heated to a temperature of 100° C. and pressed to form an about 10 μm-thick thin film which was then observed under an optical microscope (magnification: 200 times) for the presence of an agglomerate of the carbon black as the coloring pigment and the particle diameter of the coarse agglomerate to evaluate the dispersibility of the carbon black as the coloring pigment.

(Results of evaluation of dispersibility of pigment in hot melt colored ink)

The hot melt colored ink with a modified cyclic alcohol (phytosterol) incorporated therein had an excellent dispersing property, and any coarse agglomerate (an agglomerated mass of not less than 30 μm in particle diameter) of the carbon black (colorant component) was absent in the hot melt colored ink.

EXAMPLE 2

(1) A concentrate as an intermediate of a hot melt colored ink (a concentrate of a colored ink) was prepared by premixing 40% by weight of a polyethylene resin (tradename: NUC G-5391, manufactured by Nippon Unicar Co., Ltd.) with 50% by weight of a carbon black (tradename: M-130, manufactured by Cabot Corporation) and 10% by weight of a cyclic alcohol (a phytosterol) and kneading the premix by means of an existing conventional kneader (a Banbury mixer, HIDM or the like) to prepare a concentrate as an intermediate (a concentrate of a colored ink).

10% by weight of the concentrate as the intermediate was premixed with 90% by weight of a paraffin wax (tradename: Hi-Mic-2065, manufactured by Nippon Seiro Co., Ltd.), and the premix was mixed and kneaded (4 passes) by means of a three-roll mill type dispersion mixer to disperse the carbon black, thereby preparing a hot melt colored ink.

(2) A concentrate as an intermediate of a carbon black (a color concentrate) was prepared by premixing 50% by weight of a polyethylene resin (tradename: NUC G-5391, manufactured by Nippon Unicar Co., Ltd.) with 50% by weight of a carbon black (tradename: M-130, manufactured by Cabot Corporation) and kneading the premix by means of an existing conventional kneader (a Banbury mixer, HIDM or the like) to prepare a concentrate as an intermediate (a concentrate of a colored ink).

10% by weight of this concentrate as the intermediate was premixed with 5% by weight of a cyclic alcohol (a phytosterol) and 90% by weight of a paraffin wax (tradename: Hi-Mic-2065, manufactured by Nippon Seiro Co., Ltd.), and the premix was mixed and kneaded by means of a three-roll mill type dispersion mixer to prepare a hot melt colored ink.

(3) A concentrate as an intermediate of a carbon black (a color concentrate) was prepared by premixing 40% by weight of a polyethylene resin (tradename: NUC G-5391, manufactured by Nippon Unicar Co., Ltd.) with 50% by weight of a carbon black (tradename: M-130, manufactured by Cabot Corporation) and 10% by weight of a sugar cane wax, and kneading the premix by means of an existing conventional kneader (a Banbury mixer, HIDM or the like) to prepare a concentrate as an intermediate (a concentrate of a colored ink).

10% by weight of the concentrate as the intermediate was premixed with 90% by weight of a paraffin wax (tradename: Hi-Mic-2065, manufactured by Nippon Seiro Co., Ltd.), and the premix was mixed and kneaded by means of a three-roll mill type dispersion mixer to prepare a hot melt colored ink.

(4) 12.5% by weight of a general-purpose carbon master batch (a color concentrate 1), having a high carbon black concentration, prepared by dispersing (milling) 40% by weight of a carbon black in a polyethylene resin was premixed with 5 parts by weight (5% by weight) of a cyclic alcohol (a phytosterol) and 82.5% by weight of a paraffin wax (tradename: Hi-Mic-2065, manufactured by Nippon Seiro Co., Ltd.), and the premix was mixed and kneaded by means of a three-roll mill type dispersion mixer to prepare a hot melt colored ink.

(Results of evaluation of dispersibility of pigment in hot melt colored ink)

The hot melt colored inks (1), (2), (3), and (4), of Example 2, using the concentrates as the intermediate of a hot melt colored ink (concentrate of colored ink) and the general-purpose carbon master batch (color concentrate) also had an excellent carbon black dispersing property, and any coarse agglomerate having a particle diameter of not less than 30 μm was absent in the hot melt colored inks.

EXAMPLE 3

5 parts by weight of a carbon black (tradename: M-130, manufactured by Cabot Corporation) as a coloring pigment, 5 parts by weight (5% by weight) of a stearyl ester of a cyclic alcohol (a modified phytosterol), 45 parts by weight of a polyethylene resin (tradename: NUC G-5381, manufactured by Nippon Unicar Co., Ltd.), and 45 parts by weight of a microcrystalline wax (tradename: Hi-Mic-2065, manufactured by Nippon Seiro Co., Ltd.) were premixed together, and the premix was mixed and kneaded (4 passes) by means of a three-roll mill type dispersion mixer to disperse the carbon black, thereby preparing a hot melt colored ink.

This hot melt colored ink was formed into an about 10 μm-thick thin film in the same manner as in Example 1, and the film was then observed under an optical microscope (magnification: 200 times) for the presence of an agglomerate of the carbon black as the coloring pigment and the particle diameter of the coarse agglomerate to evaluate the dispersibility of the carbon black as the coloring pigment.

(Results of evaluation of dispersibility of pigment in hot melt colored ink)

As with the hot melt colored ink of Example 1, for the hot melt colored ink, with a modified cyclic alcohol (phytosterol) incorporated therein, prepared in Example 3, any coarse agglomerate (an agglomerated mass of not less than 30 μm in particle diameter) of the carbon black (colorant component) was absent in the hot melt colored ink.

COMPARATIVE EXAMPLE 1

For comparison, hot melt colored inks prepared according to formulations, wherein a cyclic alcohol (a phytosterol) and/or a modified cyclic alcohol are not incorporated, were evaluated for the dispersibility of a pigment.

5 parts by weight of a carbon black (tradename: M-130, manufactured by Cabot Corporation) as a coloring pigment, 47.5 parts by weight of a polyethylene resin (tradename: NUC G-5381, manufactured by Nippon Unicar Co., Ltd.), and 47.5 parts by weight of a microcrystalline wax (tradename: Hi-Mic-2065, manufactured by Nippon Seiro Co., Ltd.) were premixed together, and the premix was mixed and kneaded (4 passes) by means of a three-roll mill type dispersion mixer to disperse the carbon black, thereby preparing a hot melt colored ink.

This hot melt colored ink was formed into a thin film prepared in the same manner as in Example 1, and the thin film was then observed for the presence of an agglomerate of a coloring pigment and the particle diameter of a coarse particle diameter to evaluate the dispersibility of the carbon black.

(Results of evaluation of dispersibility of pigment in hot melt colored ink)

For the hot melt colored ink of Comparative Example 1 using a paraffin wax commonly used in the art, a coarse carbon black agglomerate having a particle diameter of not less than 30 μm was present in an amount of 25 to 100 coarse agglomerates/$cm^2$, that is, the dispersibility of the carbon black was poor, indicating that the comparative hot melt colored ink had a poor pigment dispersing property.

COMPARATIVE EXAMPLE 2

For comparison, a hot melt colored ink based on a carnauba wax commonly used in the conventional hot melt colored ink was evaluated.

5 parts by weight of a carbon black (tradename: M-130, manufactured by Cabot Corporation) as a coloring pigment, 47.5 parts by weight of a carnauba wax (native to Brazil, manufactured by Melilla), and 47.5 parts by weight of a microcrystalline wax (tradename: Hi-Mic-2065, manufactured by Nippon Seiro Co., Ltd.) were premixed together, and the premix was mixed and kneaded (4 passes) by means of a three-roll mill type dispersion mixer to disperse the carbon black, thereby preparing a hot melt colored ink.

This hot melt colored ink was formed into a thin film prepared in the same manner as in Example 1, and the thin film was then observed for the presence of an agglomerate of a coloring pigment and the particle diameter of a coarse particle diameter to evaluate the dispersibility of the carbon black.

(Results of evaluation of dispersibility of pigment in hot melt colored ink)

For the hot melt colored ink of Comparative Example 2 using a carnauba wax commonly used as a binder for the conventional hot melt colored ink binder, as with the hot melt colored ink of Comparative Example 1, a coarse carbon black agglomerate having a particle diameter of not less than 30 μm was present in an amount of 25 to 100 coarse agglomerates/$cm^2$ in the hot melt colored ink, that is, the dispersibility of the carbon black was poor, indicating that the comparative hot melt colored ink had a poor pigment dispersing property.

EXAMPLES 4 to 11

Hot melt colored inks were evaluated for staining by surface friction.

15 parts by weight of a carbon black (tradename: M-130, manufactured by Cabot Corporation) as a coloring pigment, 0.1 to 50 parts by weight (0.1 to 50% by weight) of a cyclic alcohol (a phytosterol) or a modified cyclic alcohol (phytosterol stearate), 1 to 50 parts by weight of a straight-chain polyethylene having a density of 0.926 g/$cm^3$ and a melt flow rate (MFR) of 50 g/10 min (tradename: NUC G-5391, manufactured by Nippon Unicar Co., Ltd.), and 10 to 70 parts by weight of a microcrystalline wax (tradename: Hi-Mic-2065, manufactured by Nippon Seiro Co., Ltd.) were premixed together, and the premix was satisfactorily mixed and kneaded by means of a heated three-roll mill type dispersion mixer to prepare hot melt colored inks. Formulations of the hot melt colored inks of Examples 4 to 11 are summarized in Table 1.

(Results of test on frictional staining by hot melt colored ink)

Any of the thermal transfer recording sheets of Examples 4 to 11 hardly caused black staining on the friction paper (white color) and, in addition, hardly caused surface roughening in the direction of friction on the surface of the thermal transfer recording sheets.

The results of evaluation based on the frictional staining test of the hot melt colored inks were reduced to the following five numerical grades and are summarized in Table 2.

5: No black staining on the white paper

4: Slight black staining on the white paper

3: Relatively significant black staining on the white paper

2: Severe black staining on the white paper

1: Severe crayon-like black staining on the white paper

COMPARATIVE EXAMPLE 3

15 parts by weight of a carbon black (tradename: M-130, manufactured by Cabot Corporation), 45 parts by weight of a carnauba wax (native to Brazil, manufactured by Melilla), and 40 parts by weight of a paraffin wax were premixed together, and the premix was mixed and kneaded by means of a heated three-roll mill type dispersion mixer in the same manner as in Examples 4 to 11 to prepare a hot melt colored ink.

Subsequently, for the hot melt colored ink of Comparative Example 3, an about 7 μm-thick thermal transfer recording sheet was prepared in the same manner as in Examples 4 to 11.

This thermal transfer recording sheet was visually inspected for black staining on the frictional paper (white color) and the damage to the surface of the thermal transfer recording sheet in the same manner as in Examples 4 to 11.

(Results of test on frictional staining by hot melt colored ink)

The thermal transfer recording sheet of Comparative Example 3 caused significant black staining on the friction paper (white color) and, in addition, caused relatively severe surface roughening on the thermal transfer recording sheet.

TABLE 1

| | Comp. | Examples | | | | | | | |
|---|---|---|---|---|---|---|---|---|---|
| Components | Ex.3 | 4 | 5 | 6 | 7 | 8 | 9 | 10 | 11 |
| Carbon M-130 | 15 | 15 | 15 | 15 | 15 | 15 | 15 | 15 | 15 |
| Cyclic alcohol | — | 0.1 | 1 | 5 | 15 | 25 | — | — | — |
| Modified cyclic alcohol | — | — | — | — | — | — | 5 | 25 | 50 |
| PE G-5391 | — | 15 | 15 | 10 | 1 | 50 | 10 | 50 | 15 |
| Paraffin wax | 45 | 45 | 69 | 70 | 69 | 10 | 70 | 10 | 20 |
| Carnauba wax | 40 | 25 | — | — | — | — | — | — | — |

The hot melt colored inks of Examples 4 to 11 prepared according to the above formulations were coated by means of a No. 3 bar coater (6.86 μm) onto a polyethylene terephthalate film to prepare about 7 μm-thick thermal transfer recording sheets.

For the thermal transfer recording sheets of Examples 4 to 11, a load of 908 g was applied thereto using a Sutherland's abrasion tester and reciprocated 40 strokes to cause friction. Thereafter, the thermal transfer recording sheets were visually inspected for black staining on a friction paper (white color) and the damage to the surface of the thermal transfer recording sheets.

The results of evaluation based on the frictional staining test of the hot melt colored inks were reduced to five numerical grades and are summarized in Table 2.

TABLE 2

| | Comp. | Examples | | | | | | | |
|---|---|---|---|---|---|---|---|---|---|
| | Ex.3 | 4 | 5 | 6 | 7 | 8 | 9 | 10 | 11 |
| Frictional staining | 2 | 4 | 5 | 5 | 4 | 5 | 5 | 5 | 4 |

EXAMPLES 12 to 19

The thermal transfer recording sheets prepared in Examples 4 to 11 were used as an ink ribbon, and an image (a print) was transferred and recorded onto a white transfer recording paper by means of a thermal transfer printer. The transferred images printed on the transfer recording paper were observed under an optical microscope for the surface smoothness of the transferred ink, feathering of the transferred ink, dropout of print, blurring of the print, smudge and the like, and the results of the evaluation on the transferred, recorded image (transferred print) were reduced to five numerical grades.

(Results of evaluation on transferred, recorded image)

The thermal transfer recording sheets according to the formulations of Examples 4 to 11 hardly caused feathering of the transferred ink in the transferred image and a smudge. Further, the surface smoothness of the transferred ink was excellent, and the dropout of the transferred image was hardly recognized, indicating that the hot melt colored inks had excellent printing properties.

The results of evaluation on the transferred, recorded images were reduced to five numerical grades and are summarized in Table 3.

In the five numerical grades on the surface smoothness, numeral 5 represents that irregularities were hardly created; numeral 4 represents that irregularities were slightly created; numeral 3 represents that irregularities were relatively significantly created; numeral 2 represents that surface irregularities were relatively severely created; and numeral 1 represents that surface irregularities were severely created. In the five numerical grades on the other properties, that is, feathering of ink, smudge, and dropout, numeral 5 represents that the phenomenon was hardly created; numeral 4 represents that the phenomenon was slightly created; numeral 3 represents that the phenomenon was relatively significantly created; numeral 2 represents that the phenomenon was significantly created; and numeral 1 represents that the phenomenon was severely created.

COMPARATIVE EXAMPLE 4

The thermal transfer recording sheet prepared in Comparative Example 3 was used as an ink ribbon, and an image was transferred and recorded onto a white transfer recording paper by means of a thermal transfer printer in the same manner as in Examples 12 to 19. The transferred image printed on the transfer recording paper was observed under an optical microscope for the surface smoothness of the transferred ink, feathering of the transferred ink, dropout of print, blurring of the print, smudge and the like, and the results of the evaluation on the transferred, recorded image were reduced to five numerical grades.

(Results of evaluation on transferred, recorded image)

As compared with the thermal transfer recording sheets according to the formulations of Examples 4 to 11, the thermal transfer recording sheet according to the formulation of Comparative Example 3 caused relatively significant feathering of the transferred ink and smudge. Further, although the surface smoothness of the transferred ink was good, the dropout of the transferred image was relatively severe.

The results of evaluation on the transferred, recorded image are summarized in Table 3.

TABLE 3

| | Formulation | Surface smoothness | Feathering of ink | Smudge | Dropout | Overall evaluation |
|---|---|---|---|---|---|---|
| Comp. Ex.4 | Comp. Ex.3 | 4 | 3 | 2 | 2 | 3 |
| Examples | | | | | | |
| 12 | Ex.4 | 4 | 5 | 4 | 4 | 4 |
| 13 | Ex.5 | 5 | 5 | 5 | 4 | 5 |
| 14 | Ex.6 | 5 | 5 | 5 | 5 | 5 |
| 15 | Ex.7 | 5 | 4 | 4 | 4 | 4 |
| 16 | Ex.8 | 5 | 5 | 5 | 5 | 5 |
| 17 | Ex.9 | 5 | 5 | 5 | 5 | 5 |
| 18 | Ex.10 | 5 | 5 | 5 | 5 | 5 |
| 19 | Ex.11 | 5 | 5 | 4 | 5 | 5 |

INDUSTRIAL APPLICABILITY

According to the present invention, incorporation of a phytosterol and/or a modified phytosterol having affinity for coloring pigments, such as a carbon black, and dyes and excellent compatibility with polyethylene resin and, in addition, excellent compatibility with waxes, such as naturally occurring waxes and synthetic waxes, and other thermoplastic resins can realize the production of hot melt colored inks, for thermal transfer recording materials, having an excellent capability of dispersing colorants, including pigments, such as carbon black, and dyes, and can realize the production of hot melt colored inks, for thermal transfer recording materials, having better affinity for and adhesion to recording materials, such as papers, on which an image is to be transferred, as compared with hot melt colored inks prepared by incorporating the conventional straight-chain wax.

Further, the present invention enables an inexpensive polyethylene resin, which has hitherto been regarded as practically unusable, to be incorporated as a binder for a hot melt colored ink, and hence can provide a hot melt colored ink, for a thermal transfer recording material, which can yield a print having excellent surface print layer strength on a recording material (a recording paper on which an image is to be transferred) without creating feathering of the transferred image (transferred print), blurring of the print, smudge, unclear image and other unfavorable phenomena, the transferred image (transferred print) having excellent properties.

Further, it should be noted that naturally occurring waxes, such as carnauba wax, which have hitherto been generally used as a binder for a colored ink are greatly influenced by weather conditions, disasters and the like, posing a problem of stable supply thereof. In addition, they are expensive and unfavorably cause a sharp fluctuation in price. The present invention can provide a hot melt colored ink free from the above problems.

We claim:

1. A hot melt colored ink composition comprising:

at least one coloring component selected from the group consisting of carbon black, an inorganic pigment, an organic pigment, a dye and an inorganic extender pigment; and a phytosterol component present in an amount of 0.1 to 90% by weight of the hot melt colored ink composition, said phytosterol component being at least one of phytosterol and a derivative thereof, said derivative being selected from the group consisting of a phytosterol in which a hydroxyl group in a cyclic alcohol of the phytosterol is substituted, an ester of phytosterol with an organic acid or an inorganic acid, a phytosterol metal additive compound, an alkoxylated phytosterol, and hydrogenated phytosterol.

2. A hot melt colored ink composition comprising:

at least one coloring component selected from the group consisting of carbon black, an inorganic pigment, an organic pigment, a dye and an inorganic extender pigment;

a phytosterol component present in an amount of 0.1 to 90% by weight of the hot melt colored ink composition, said phytosterol component being at least one of phytosterol and a derivative thereof, said derivative being selected from the group consisting of a phytosterol in which a hydroxyl group in a cyclic alcohol of the phytosterol is substituted, an ester of phytosterol with an organic acid or an inorganic acid, a phytosterol metal additive compound, an alkoxylated phytosterol, and hydrogenated phytosterol a thermoplastic resin in an amount of 1 to 80% by weight of the hot melt ink composition.

3. The hot melt colored ink composition according to claim 2, wherein the thermoplastic resin comprises a polyethylene resin.

4. The hot melt colored ink composition according to claim 2, further comprising at least one wax selected from the group consisting of a natural wax, a mineral wax and a synthetic wax.

5. The hot melt colored ink composition according to claim 3, further comprising at least one wax selected from the group consisting of a natural wax, a mineral wax and a synthetic wax.

* * * * *